(12) United States Patent
Proscia et al.

(10) Patent No.: US 11,528,536 B2
(45) Date of Patent: Dec. 13, 2022

(54) METHOD OF DISTRIBUTING FILES THROUGH A CONTENT DELIVERY NETWORK BASED ALSO ON ARTIFICIAL INTELLIGENCE ALGORITHMS, TELEMATIC SYSTEM AND SERVERS THAT ALLOW TO IMPLEMENT IT

(71) Applicant: MAINSTREAMING S.p.A., Milan (IT)

(72) Inventors: Giovanni Proscia, Balsamo (IT); Antonio Gregorio Corrado, Lugano Paradiso (CH); Philippe Ange Michel Tripodi, Milan (IT); Sergio Ambrogio Bruno Carulli, Milan (IT)

(73) Assignee: MAINSTREAMING S.p.A., Milan (IT)

( * ) Notice: Subject to any disclaimer, the term of this patent is extended or adjusted under 35 U.S.C. 154(b) by 0 days.

(21) Appl. No.: 17/371,633

(22) Filed: Jul. 9, 2021

(65) Prior Publication Data
US 2022/0021945 A1 Jan. 20, 2022

(30) Foreign Application Priority Data

Jul. 14, 2020 (IT) .......................... 102020000017023

(51) Int. Cl.
H04N 21/222 (2011.01)
H04N 21/231 (2011.01)
H04N 21/485 (2011.01)

(52) U.S. Cl.
CPC ......... *H04N 21/485* (2013.01); *H04N 21/222* (2013.01); *H04N 21/23103* (2013.01); *H04N 21/23116* (2013.01)

(58) Field of Classification Search
None
See application file for complete search history.

(56) References Cited

U.S. PATENT DOCUMENTS

| 6,742,082 | B1 * | 5/2004 | Lango | H04L 65/765 348/E7.071 |
| 7,603,439 | B2 * | 10/2009 | Dilley | H04L 67/568 711/122 |
| 9,293,042 | B1 * | 3/2016 | Wasserman | G08G 1/09 |

(Continued)

*Primary Examiner* — William J Kim
(74) *Attorney, Agent, or Firm* — Dickinson Wright PLLC; Nicholas P. Coleman

(57) ABSTRACT

An edge server of a content delivery network includes an electronic communication unit adapted to be connected to a telematic network and a processing electronic unit adapted to process data packages received and to be transmitted by the electronic communication unit; the processing electronic unit having a first storage sub-unit suitable adapted to store contents and a second storage sub-unit adapted to store configuration information related to a home point of presence of the edge server; the electronic processing unit is programmed to deal with content requests, so that in response to a request for a content if it is, in whole or in part, locally possessed, sends the content and otherwise determines a server address by performing a calculation on a name of the content taking into account configuration information, and causes a request related to the content to be sent to the server address.

15 Claims, 3 Drawing Sheets

(56) References Cited

U.S. PATENT DOCUMENTS

| | | | |
|---|---|---|---|
| 2005/0055425 A1* | 3/2005 | Lango | G06F 16/10 |
| | | | 348/E7.071 |
| 2008/0222281 A1* | 9/2008 | Dilley | H04L 67/52 |
| | | | 709/223 |
| 2009/0083279 A1* | 3/2009 | Hasek | H04N 21/21815 |
| 2011/0082982 A1 | 4/2011 | Harvell et al. | |
| 2014/0036918 A1* | 2/2014 | Varvello | H04L 12/6402 |
| | | | 370/392 |
| 2015/0341755 A1* | 11/2015 | Choi | H04L 67/12 |
| | | | 455/457 |
| 2016/0149810 A1* | 5/2016 | Liu | H04L 45/12 |
| | | | 370/392 |
| 2018/0205802 A1* | 7/2018 | Bowen | H04L 65/75 |
| 2020/0169762 A1* | 5/2020 | Goluguri | H04N 21/437 |
| 2020/0244758 A1* | 7/2020 | Enguehard | H04L 65/80 |
| 2020/0259890 A1* | 8/2020 | Luft | H04N 21/4331 |
| 2022/0132183 A1* | 4/2022 | Sotnikov | H04N 21/2665 |

* cited by examiner

METHOD OF DISTRIBUTING FILES THROUGH A CONTENT DELIVERY NETWORK BASED ALSO ON ARTIFICIAL INTELLIGENCE ALGORITHMS, TELEMATIC SYSTEM AND SERVERS THAT ALLOW TO IMPLEMENT IT

FIELD OF THE INVENTION

The present invention relates to a method of distributing contents, in particular files or streams, through a CDN (=Content Delivery Network), as well as a telematic system and servers that allow to implement it.

STATE OF THE ART

The use of contents, in particular multimedia contents (e.g. videos), through the Internet is constantly increasing. The size in bytes, or rather in Gbytes, of the contents used is also increasing.

The difficulties in achieving the dissemination of such contents increase in the case in which the content corresponds to a "live" event, i.e. the content is created practically at the same time as when it is enjoyed.

In general, difficulties in achieving the dissemination of such contents are due to the fact that the Internet was not originally designed to transmit data sensitive to propagation delay. For example, when a person watches a film or a sporting event, he or she wishes, or rather needs, the images to arrive with a substantially uniform rhythm; it is extremely unpleasant that the video is jerky.

FIG. 1 shows a "origin server" 100 connected to a CDN 1000 to distribute multimedia contents for example in the form of files it possesses. In FIG. 1 it is assumed, for simplicity's sake, that the origin server 100 stores within it (entirely) only one file F to be distributed, and that there is a PC (=Personal Computer) 200 of a single user who is interested in enjoying the content of the file F.

According to a known solution, the distribution of the file F takes place via the CDN 1000 which comprises a plurality of distributor servers 1100 and 1200 and 1300, also called "acquirers", and a plurality of edge servers 1510, 1520, 1610, 1710; the edge servers are connected to the distributing servers through a telematic network; in general, the edge servers are part of the internet, i.e. the entire CDN is implemented at least in part through the internet. In FIG. 1, it can be seen that the edge servers 1510 and 1520 belong to a first POP 1500 (=Point of Presence) associated with a first distributor server 1100, the edge server 1610 belongs to a second POP 1600 associated with a second distributor server 1200, the edge server 1710 belongs to a third POP 1700 associated with a third distributor server 1300; in general, each of these POPs comprises a group of edge servers and their number is variable.

In FIG. 1, the PC 200 is connected to the server 1510; when the user of the PC 200 requests the file F, the PC 200 asks the edge server 1510 for it; if the edge server 1510 has already stored the file F in its memory, it sends it to the PC 200, otherwise it requests it from the distributor server 1100; typically, the distributor server 1100 has already stored the file F in its memory and it therefore sends it to the edge server 1510 which in turn forwards it to the PC 200; due to its function as a distributor, the distributor server 1100 possesses a copy of the file F it received from the origin server 100.

If, according to this known solution, a "new" or "recent" file (and therefore not yet replicated in the distributor servers) is requested by a large number of people (e.g. there is an important football match and many people want to watch it in real time, i.e. while it is being played), the origin server of this file finds itself inundated with requests from many distributor servers. In order to cope satisfactorily with such requests, the CDN, but especially the origin server, would have to be sized according to possible request peaks.

Obviously, this is especially disadvantageous because, when the request peak is over, the resources (mainly the hardware resources) of the origin server will be largely unused.

In addition, it must also be taken into account that the various POPs may be located and serve different geographical areas and more or less distant from the place where the origin server is located (or rather connected to the Internet); for example, the origin server may be in Europe and a large number of people interested in the file may be in both Europe and the USA. Therefore, it may still not be easy to ensure a good connection between any distributor server and the origin server.

SUMMARY

The general object of the present invention is to improve the known art.

This general object as well as other more specific objects are achieved thanks to the solutions which are the subject of the appended claims which form an integral part of the present description.

The idea is to implement a "distributed" and "flexible" distribution, in particular based on a CDN without distributor or "acquirer" servers.

The present invention applies both in the case in which the contents to be distributed are "monolithic" files (which can be segmented for example at the "transport" level), and in the case in which the contents to be distributed are "fragmented" files (for example at the "application" level), and in the case in which the contents to be distributed are "streams", that is, indefinite sequences of "fragments" without a real beginning and a real end (or rather the beginning and end of which are not known). The core of the present invention refers to what typically happens in the CDN when, at the beginning, a user telematic device sends a content request to an edge server. Once such a request has started to be dealt with, i.e. the first segment or fragment of the requested content has arrived at the user telematic device, the further segments or fragments will follow within the CDN typically the same path as the first one (this may not apply if, for example, there is a failure in the CDN); the path followed comprises a CDN edge server and possibly one or more CDN "intermediary" servers.

The path of the segments or of the fragments within the CDN derives in the first instance from one or more mathematical calculations performed by one or more CDN servers, in particular by an edge server and by "intermediary" servers; advantageously, an integer number is mathematically calculated which constitutes an offset with respect to a reference address associated with a Point Of Presence; even more advantageously, a mathematical formula used for the calculation is such that the integer number calculated is comprised between 0 and NPOP-1 (where NPOP is the number of servers of the POP) or is comprised between 1 and NPOP. US 2011/082982 A1 describes various solutions for determining the path within the CDN. A first group of these solutions provides for determining the path based on the result of searches for the content of interest carried out "uniformly", i.e. simultaneously or almost simultaneously in the various POP servers of the CDN; thus, the solutions of the first group are not very efficient. A second group of these solutions provides for deriving the path from maps or tables that are consulted based on the URI or part of the URI of the content of interest—in the event of exceptions, a predefined path is used; therefore, disadvantageously, the solutions of the second group require that maps or tables are stored (and kept up-to-date) in the various servers of the CDN, the sizes of which depends on all the contents distributed by the CDN (which are generally many, i.e. a number that can range from a few thousand to a few million, and continues to grow). According to a typical embodiment example (see TABLE I and related description), the contents are distributed among the CDN servers according to the client (ACME, Smith, ShoeExpress, etc.).

On the other hand, the present invention only requires that each server of the CDN maintains, in its own memory, only mathematical formulae for the mathematical calculation (in particular, a single mathematical formula); such mathematical formulae (or such mathematical formula) could even be the same for all the servers of the CDN. Furthermore, according to the present invention, each server keeps, in its own memory, for each POP of interest (typically a home POP, a neighbour POP and a parent POP) two pieces of information: a reference address associated with the POP and the number of servers belonging to the POP.

Therefore, the path determination within the CDN is efficient, requiring very little memory in the servers and no updates even if the contents distributed by the CDN continue to increase.

As will become clearer in the following, according to the present invention, the path used may also be influenced by artificial intelligence algorithms and be different from the mathematically calculated path, but only under certain special conditions while as a rule the mathematical calculation is followed. For instance, through an analysis based on artificial intelligence, it could be established that at a certain moment, a certain "intermediary" server (whose address derives from the mathematical calculation) is to be avoided, for example for a certain content.

From the following it will be understood that embodiment examples of the present invention allow high throughput and very low latency (commonly known as "ultra-low latency"), i.e. they can be defined as HTULL.

LIST OF FIGURES

The present invention shall become more readily apparent from the detailed description that follows to be considered together with the accompanying drawings in which.

As can be easily understood, there are various ways of practically implementing the present invention which is defined in its main advantageous aspects in the appended claims and is not limited either to the following detailed description or to the appended drawings.

DETAILED DESCRIPTION

Figure 1:
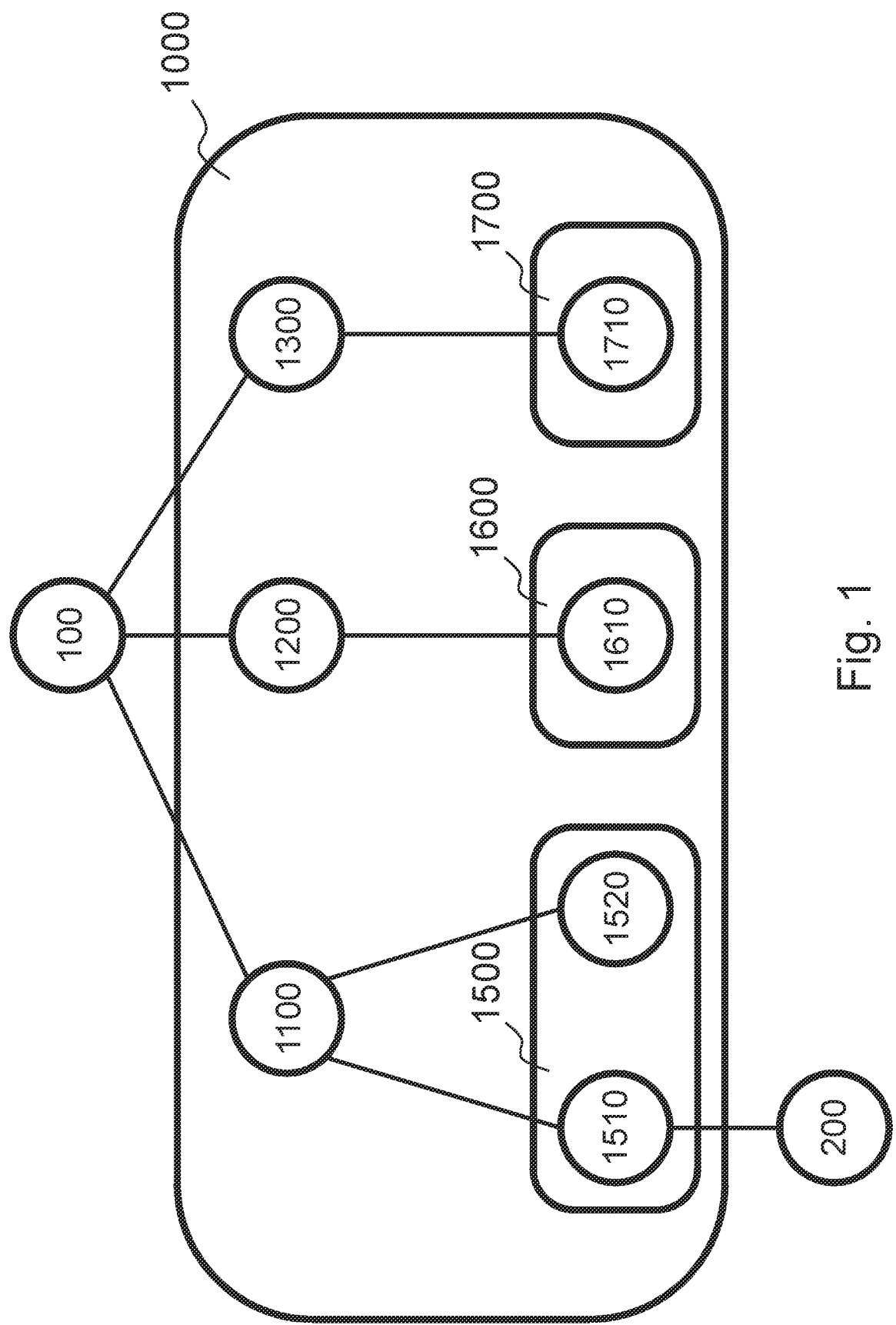
FIG. 1 shows a block diagram of a known architecture for distributing contents in the form of files.
Figure 2:
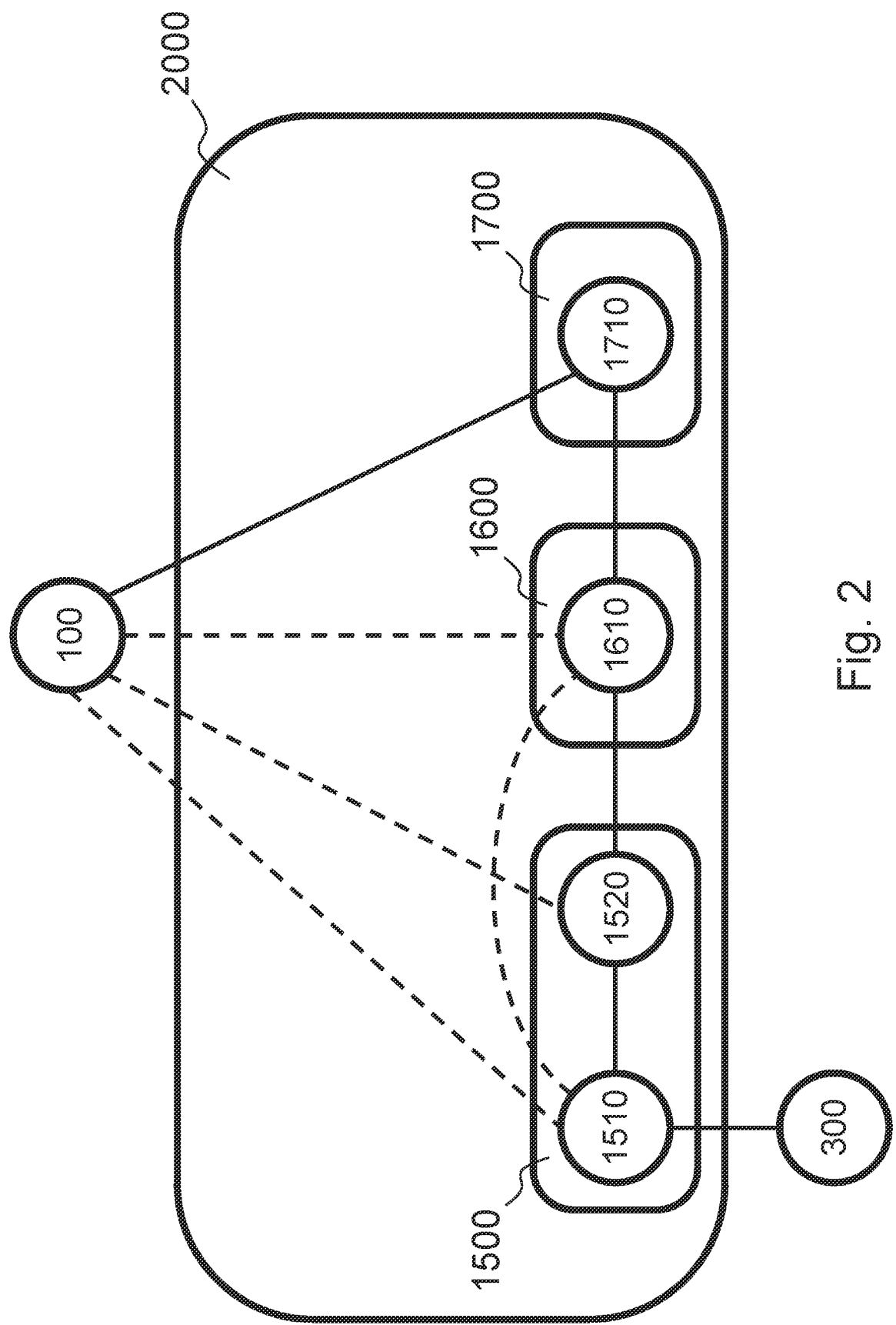
FIG. 2 shows a block diagram of an embodiment example of an inventive architecture for distributing contents in the form of files—this is an exemplary situation.

FIG. 2 shows the same blocks as in FIG. 1 as components of a CDN. However, the blocks (e.g. 1510, 1520, 1610, 1710) that make up the CDN 2000 in FIG. 2 are different internally from the blocks that make up CDN 1000 in FIG. 1 even though they are associated with the same numerical reference; it can be said, essentially, that the blocks differ in the software and/or the firmware that is run to distribute files, i.e. the contents.

Typically, also the CDN 2000 in FIG. 2 is implemented through the Internet like the CDN 1000 in FIG. 1. Also in this case, it is possible that part of the telematic network on which the CDN 2000 in FIG. 2 is based, is not realised through the Internet, but through dedicated private connections (typically this could apply to the connections between edge servers of the same POP and possibly connections between edge servers of different POPs). It should be noted that, in general, the connections shown in FIG. 2 are not physical connections, but are the logical connections among the components of the CDN.

In FIG. 2, it can be seen that the edge servers 1510 and 1520 belong to a first POP 1500 which will be called "home POP"; the edge server 1610 belongs to a second POP 1600 which will be called "parent POP"; the edge server 1710 belongs to a third POP 1700 which will be called "grandparent POP". In general, each of the POPs comprises a group of edge servers and their number is variable. All edge servers have the primary task of communicating (directly or indirectly with the user telematic devices of the users—in FIG. 2 only one user telematic device 300 is shown). Furthermore, according to some aspects of the present invention, the edge servers have the primary task of communicating to each other. Finally, according to some aspects of the present invention, the edge servers have the primary task of communicating with one or more origin servers (in FIG. 2 only one origin server 100 is shown).

In the present document (and according to the present invention), "POP" means a set of computer systems (which also and especially includes edge servers) serving the users in a predetermined geographical area. The components of a POP are typically, but not necessarily, located close to each other. More than one POP may be present in the same data room.

In the following, the description of the present invention will begin by referring to the case of distributing a "monolithic" file F, typically of large size, disregarding the fact that this may be divided at the transport level into "segments" and possibly at an even lower level into "IP packages". This description also applies exactly to the case of distributing a content divided into "fragments" at the "application" level, considering the equivalence between a single fragment and the file.

As anticipated, according to the present invention, the path of the content within the CDN derives in the first instance from one or more mathematical calculations performed by one or more servers of the CDN on the name of the content (all or part).

According to the specific example in FIG. 2, the device 300 is connected to the edge server 1510; when the user of the device 300 wants a content C corresponding to a file F, the device 300 requests the file F from the edge server 1510. If the edge server 1510 has already stored a copy (total or partial) of the file F in its memory, it sends the copy to the device 300, otherwise it requests it from the edge server 1520 (which is determined by means of a mathematical calculation). If the edge server 1520 has already stored a copy (total or partial) of the file F in its memory, it sends the copy to the edge server 1510, otherwise it requests it from the edge server 1610 (which is determined by means of a mathematical calculation). If the edge server 1610 has already stored a copy (total or partial) of the file F in its memory, it sends the copy to the edge server 1520, otherwise it requests it from the edge server 1710 (which is determined by means of a mathematical calculation). If the edge server 1710 has already stored a copy (total or partial) of the file F in its memory, it sends the copy to the edge server 1610, otherwise it requests it from the origin server 100.

From the foregoing, it is understood that, according to the present invention, there is a sequence of forwarding of the file request and a corresponding "data path" within the CDN of the file data (more generally of content) up to the telematic device of the user interested in the file.

It should be noted that, in general, there is no fixed and predetermined connection between a user telematic device and an edge server. In fact, when a user telematic device (by means of an appropriate software, typically a "player" or a "browser") signals to a CDN that it is interested in a content, it is the CDN that determines which edge server is the one to which the device must connect (and ensures that the connection takes place) and request the file or files related to this content. The present invention disregards how this preliminary step is carried out, which is known in various embodiments.

According to three configuration scenarios (of the CDN related to the file F) different from what was described in the previous paragraph (consider the connections shown with dotted line in FIG. 2), if one of the edge servers 1510 or 1520 or 1610 has not yet stored in its memory a copy (total or partial) of the file F, it requests the copy to the origin server 100.

It is worth pointing out that in the example in FIG. 2, the forwarding sequence of the request for the file F (and the corresponding "data path") comprises one edge server (specifically the server 1510), two edge servers acting as "intermediary servers" (specifically the servers 1520 and 1610), one edge server acting as a "master server" (specifically the server 1710), and one origin server (specifically the server 100).

It is also possible that an edge server decides to request a copy of the file F from another edge server or alternatively from the origin server based on criteria that are fixed and predetermined or variable and determined (by other people and/or other devices) during the operation of the CDN 2000.

The forwarding sequence of file requests (e.g. the one previously indicated 1510, 1520, 1610, 1710, 100) can be dynamically changed e.g. by the CDN manager.

In general, the forwarding sequence of a request for a file depends on the user telematic device, on the edge server that received the file request from the user telematic device and on the origin server (in particular its geographic position with respect to the geographic position of the user telematic device); the forwarding sequence may also be influenced, typically, by the configuration of the CDN during the period of time in which the request for the file (more generally for content) is satisfied.

The request sequence depends on the file. For example, there may be a first sequence for a first file and a second sequence for a second file. This may also be due to the fact that the first file is distributed by a first origin server and the second file is distributed by a second origin server.

As already mentioned, the forwarding sequence of the requests for a file (and the corresponding "data path") can also be influenced by artificial intelligence algorithms.

One possibility is, for example, to use a real-time and historical database to detect "patterns" related to the performance and/or errors of a server deriving from mathematical calculation. If no "risky" pattern has been identified, the mathematically calculated server would be used for the requested content; on the contrary, a different server could be chosen; for example, this different server could derive from other calculations and/or research.

If, according to this inventive solution, a content is requested by a large number of people (e.g. there is an important football match and many people want to watch it in real time, i.e. while it is being played), the load of the requests can be divided among a plurality of "intermediary servers".

The match between content C desired by the user and e.g. file F, i.e. URL or URI of the file, is typically made through a client program run by the user telematic device (the same consideration applies to any match between content and "stream"). The client program run by the user telematic device may also help to choose or determine the edge server from which to request the file.

In the previous paragraphs, the focus was placed on the file request forwarding, in particular of the file F.

Typically, if the server 1510 has stored a copy of the file F it sends it to the device 300 directly, if the server 1520 has stored a copy of the file F it sends it to the device 300 through the server 1510, if the server 1610 has stored a copy of the file F it sends it to the device 300 through the servers 1510 and 1520, if the server 1710 has stored a copy of the file F it sends it to the device 300 200 through the servers 1510 and 1520 and 1610.

If the file F is passed from one server to another, it may be advantageous for the other server to store it in its inside for future requests.

The scenarios described above are to be extended to a plurality of users with their user telematic device (e.g., laptops, desktops, tablets, "smart phones", "smart TVs", set-top boxes, or other user electronic devices with telematic capabilities) to enjoy the contents and a plurality of files corresponding to the contents. Typically, the source of the files will be different; for example, the files F1, F2 and F3 will originate from an OS1 server and the files F4, F5 and F6 will originate from an OS2 server.

In general, the method according to the present invention serves to distribute contents, more particularly multimedia contents, even more particularly multimedia contents for streaming services. In particular, a content may be in the form of a file (monolithic or fragmented) or of a "stream" (which is typically divided into fragments).

Typically, distribution takes place from a origin server (see for example 100 in FIG. 2) to a plurality of edge servers (see for example 1510 in FIG. 2) through a plurality of intermediary servers (see for example 1520, 1610, 1710 in FIG. 2). The edge and intermediary servers constitute a CDN (see for example 2000 in FIG. 2) and are connected between each other by a telematic network, in particular the Internet. Configuration information is stored in each edge server (see for example 1510 in FIG. 2) at least related to a home POP (see for example 1500 in FIG. 2); this is the POP to which each edge server belongs respectively; the information related to the home POP will typically be the number of servers making it up and their address. In flowchart 3000 in FIG. 3 there is only one "begin processing" block 310 and a series of "end processing" blocks 316 (following block 315), 326 (following block 325), 336 (following block 335) and 350 (following blocks 334 and 347) as appropriate.

In general, the method comprises the following steps:

a) (block 312 in FIG. 3) an edge server receives from a user telematic device a request for a file F, then b) (block 313 in FIG. 3) the edge server verifies if it possesses a copy of the file F, then c) (branch Y of block 314 in FIG. 3) if the verification at step b is positive, the edge server sends (block 315 in FIG. 3) to the telematic user device the file F, and (branch N of block 314 in FIG. 3) if the verification at step b is negative, the edge server determines (block 317 in FIG. 3) an address of a neighbour server—the edge server and the neighbour server belong to the same home POP, then if the verification at step b is negative, d) (block 318 in FIG. 3) the edge server sends to the address of the neighbour server a request for the file F;

so the neighbour server is to be considered as an "intermediary" server.

The address referred to at step "c" (block 317 in FIG. 3) is obtained by performing a mathematical calculation on the name of the file F taking into account the configuration information stored in the server, in particular in the edge server.

For example, supposing that the POP, in particular the home POP, comprises four servers; the name of the file could be taken, turned into a binary number, divided by four and the remainder of the division considered; if the remainder is zero a first one of the four servers is chosen as the address, if the remainder is one a second one of the four servers is chosen as the address, if the remainder is two a third one of the four servers is chosen as the address, if the remainder is three a fourth one of the four servers is chosen as the address.

This way of proceeding leads to a division of the files between the four POP servers, in particular the home POP, which is a function of a mathematical formula.

Typically and advantageously, the mathematical calculation determines an integer number which represents an offset with respect to a reference address associated with a Point Of Presence. For example, the reference address of the Point Of Presence considered could be "N1.N2.N3.1" (e.g. an IPv4 address) and then all its servers are identified by a different address but whose first three numbers are the same; if the result of the calculation is 0 the address sought is "N1.N2.N3.1", if the result of the calculation is 1 the address sought is "N1.N2.N3.2", and so on.

Typically and advantageously, the mathematical calculation determines an integer number that is comprised between a lower limit and an upper limit; the lower limit can be for example 0 and the upper limit can be for example the number of servers belonging to the Point Of Presence considered decreased by 1. Alternatively, the lower limit may be for example 1 and the upper limit may be for example the number of servers belonging to the Point Of Presence considered; there are of course other equivalent solutions. In this way, no addressing problems or exceptions are created.

Typically and advantageously, the mathematical calculation is based on a mathematical formula that is conceptually divided into two parts: a first part of the formula takes all or part of the file name and transforms it into a binary or decimal number, a second part of the formula takes the binary or decimal number, the first input parameter, and generates an integer number, typically taking into account also a second input parameter that corresponds to the maximum integer number to be generated (which is the number of servers of the Point Of Presence considered).

With regards to the first part of the formula, it is assumed that the file of interest is "https://samplepath/samplefile.mov", its URI (="Uniform Resource Identifier") be considered. According to a first possibility, for example "samplefile.mov" is extracted from the URI, and is converted into a binary number using, for example, the ASCII encoding of the characters that make up "samplefile.mov"; the binary number "73 61 6d 70 6c 65 66 69 6c 65 2e 6d 6f 76" is thus obtained (in hexadecimal notation). According to a second possibility, the whole URI is used, and converted into a binary number using for example the CRC-8 (="Cyclic Redundancy Check" at 8 bit); the binary number "F0" is thus obtained (in hexadecimal notation).

It is understood that there are many other possibilities.

As for the second part of the formula, there is a first possibility based on a "floor" function and a second possibility based on a "sin" function (which, of course, requires some form of rounding off):

$$f(x, y) = x - \left(\left\lfloor\left(\frac{x}{y}\right)\right\rfloor * y\right)$$

$$f(x, y) = (|\sin x|(y - 1))$$

where "x" is the number deriving from the first part of the mathematical formula and "y" is the number of servers of the Point Of Presence considered.

It is understood that there are many other possibilities.

In general, the term "file name" or "full file name" means the set of one or more of the following components: "host", "device" or "drive", "path" or "directory", "file", "format" or "extension", version—see for example Wikipedia. Typically, according to this description, the "file name" consists of "host"+"path"+"file"+possibly "extension". Similar considerations apply to the "stream name" in the case where the present invention is applied to the distribution of "streams".

In general, the above mathematical calculation does not necessarily have to take into account the whole "name", but could take into account one or more parts of the whole "name", for example simply the "file" and/or the "path". Similar considerations apply to the mathematical calculations performed on names mentioned below.

It should be noted that according to some embodiment examples and under certain conditions, the mathematical calculation referred to at step "c" could result in the sought neighbour server coinciding with the edge server. In this case, the edge server could send the request directly to a parent server as it does not make sense for the edge server to request for the file to itself as it has already been verified that it does not have a copy.

This offset-based way of proceeding preferably requires the numbering of the servers within the POP to be continuous and progressive.

In addition, the method may also provide as follows:

Configuration information can also be stored in the neighbour server (see for example 1520 in FIG. 2) at least related to a parent POP (see for example 1600 in FIG. 2); this is a POP to which neither the edge server nor the neighbour server belongs (which belong to the same home POP); the information related to the parent POP will typically be the number of servers making it up and their address.

The method can further comprise the following steps:

e) (block 322 in FIG. 3) the neighbour server receives from the edge server a request for the file F, then e) (block 323 in FIG. 3) the neighbour server verifies if it possesses a copy of the file F, then g) (branch Y of block 324 in FIG. 3) if the verification at step f is positive, the neighbour server sends (block 325 in FIG. 3) to the edge server the file F, and (branch N of block 324 in FIG. 3) if the verification at step f is negative, the server neighbour determines (block 327 in FIG. 3) a parent server address—the neighbour server belongs to the home POP and the parent server belongs to the parent POP other than the home POP, then if the verification at step f is negative, h) (block 328 in FIG. 3) the neighbour server sends to the parent server address a request for the file F;

so the parent server is also to be considered as an "intermediary" server.

The address referred to at step "g" (block 327 in FIG. 3) can be obtained by performing a mathematical calculation on the name of the file F taking into account the configuration information stored in the server, in particular on the neighbour server. A mathematical calculation can be performed that is identical or similar to the one described above. But conceptually, a different mathematical calculation could also be performed.

This way of proceeding implies that the files are divided congruently between the POP servers, in particular the parent POP.

Based on configuration information stored in the edge server (see for example 1510 in FIG. 2) and on a mathematical calculation, the edge server could send a request related to a file directly to a parent server (see for example 1610 in FIG. 2) of a parent POP (see for example 1600 in FIG. 2) other than the home POP (see for example 1500 in FIG. 2). This possibility is not shown in the flow chart 3000 in FIG. 3, but is shown in FIG. 2 with an arcuate and dotted line connecting 1510 to 1610. In addition to or as an alternative to what is described in the previous paragraph, based on configuration information stored in the edge server (see for example 1510 in FIG. 2), the edge server could send a request related to a file directly to a origin server (see for example 100 in FIG. 2). This possibility is not shown in the flow chart 3000 in FIG. 3.

In addition, the method may also provide as follows:

Configuration information can also be stored in the parent server (see for example 1610 in FIG. 2) at least related to a grandparent POP (see for example 1700 in FIG. 2); this is a POP to which neither the neighbour nor the parent server belongs; the information related to the grandparent POP will typically be the number of servers making it up and their address.

The method can further comprise the following steps:

i) (block 332 in FIG. 3) the parent server receives from the neighbour server a request for the file F, then l) (block 333 in FIG. 3) the parent server verifies if it possesses a copy of the file F, then m) (branch Y of block 334 in FIG. 3) if the verification at step 1 is positive, the parent server sends (block 335 in FIG. 3) to the neighbour server the file F, and (branch N of block 334 in FIG. 3) if the verification at step 1 is negative, the parent server determines (block 337 in FIG. 3) a grandparent server address—the parent server belongs to the parent POP and the grandparent server belongs to the grandparent POP other than the parent POP, then if the verification at step 1 is negative, n) (block 338 in FIG. 3) the parent server sends to the grandparent server address a request for the file F;

so the grandparent server is also to be considered as an "intermediary" server.

The address at step "m" (block 337 in FIG. 3) can be obtained by performing a mathematical calculation on the name of the file F taking into account the configuration information stored in the server, in particular on the parent server. A mathematical calculation can be performed that is identical or similar to the one described above. But conceptually, a different mathematical calculation could also be performed.

This way of proceeding implies that the files are divided congruently between the POP servers, in particular the grandparent POP.

In addition, the method may also provide as follows:

Configuration information can also be stored on the grandparent server (see for example 1710 in FIG. 2) at least related to a origin server address (see for example 100 in FIG. 2) for the file F.

The method can further comprise the following steps:

o) (block 342 in FIG. 3) the grandparent server receives from the parent server a request for the file F, then p) (block 343 in FIG. 3) the grandparent server verifies if it possesses a copy of the file F, then q) (branch Y of block 344 in FIG. 3) if the verification at step p is positive, the grandparent server sends (block 345 in FIG. 3) to the parent server the file F, and (branch N of block 344 in FIG. 3) if the verification at step p is negative, the grandparent server sends (block 347 in FIG. 3) to the origin server address a request for the file F.

In general, according to the present invention, it may be provided that any server, in particular an edge server or a neighbour server or a parent server or a grandparent server, forwards a file request to an intermediary server belonging to a different POP; in this sense, the external server called into question may be called "parent" because of its logical link with the server that calls it into question.

In addition, the method may also provide as follows:

In general, according to the present invention, it may be provided that the configuration information is stored in one or more intermediary servers at least related to addresses of a origin server for one or more files. In this case, on each file request, an intermediary server can verify if it is a "master" server related to the requested file, and if this verification is positive and if it does not possess a copy of the requested file, it sends a request for this file to the origin server. In fact, the above verification of the "master" condition can also be done from the edge server.

In the previous paragraphs, reference is made to mathematical calculations performed on file names. It must be clear that such mathematical calculations do not necessarily imply the use of all components of the file names. For example, according to typical embodiment examples, such mathematical calculations are performed only on the paths or part of paths.

In the previous paragraphs, the exchange of file requests was mainly described. Obviously, in response to these file requests, the files must then arrive at the user telematic device.

Figure 3:
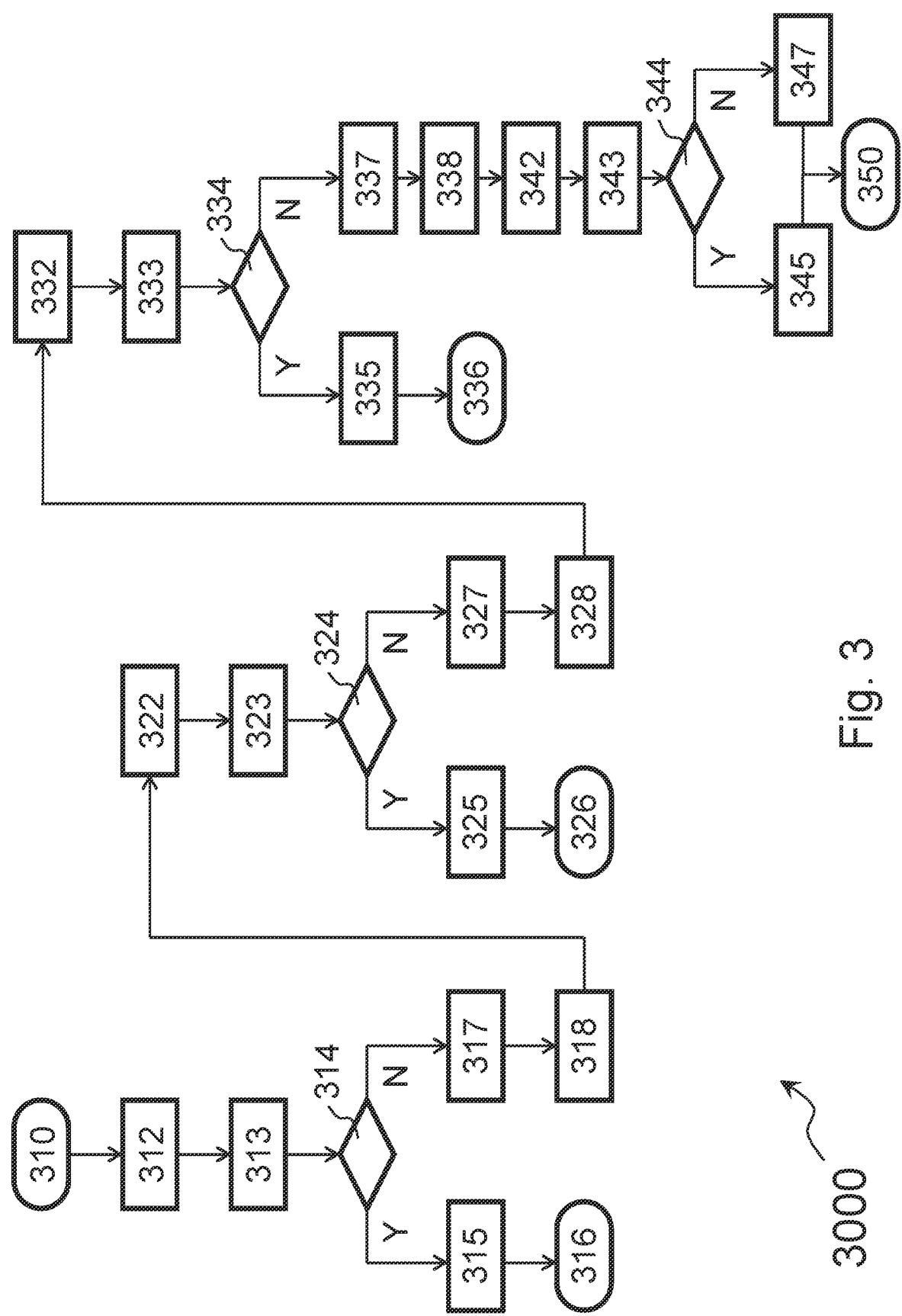
FIG. 3 shows a flow chart of an embodiment example of an inventive method of distributing files.

In the exemplary flowchart 3000 in FIG. 3, only the first sending of the file F has been highlighted. Block 315 refers to the sending of the file F from the edge server to the user telematic device. Block 325 refers to the sending of the file F from the neighbour server to the edge server; this is followed by a forwarding of the file F up to the user telematic device. Block 335 refers to the sending of the file F from the parent server to the neighbour server; this is followed by a forwarding of the file F to the user telematic device. Block 345 refers to the sending of the file F from the grandparent server to the parent server; this is followed by a forwarding of the file F to the user telematic device. Finally, there is/can be a sending of the file F from the origin server to the user telematic device through a certain number of servers (at least one server).

As already mentioned, the present invention applies to the distribution of both "monolithic" and "fragmented" files and "streams". What has been said in the previous paragraphs can be adapted to realise "fragmented" file distribution methods and "stream" distribution methods, which will be discussed in more detail below.

Distribution methods equal or similar to those just described can be and are typically implemented by a telematic system comprising a plurality of edge servers and a plurality of intermediary servers of an innovative CDN adapted to be connected between them by a telematic network, in particular the Internet.

These servers must be appropriately configured and programmed such that they implement the desired method.

Fundamentally and conceptually, within such an innovative CDN there are two types of server: the edge servers (i.e. those communicating with the user telematic devices) and the intermediary servers.

In general, a server of such an innovative CDN comprises:
an electronic communication unit adapted to be connected to a telematic network, in particular the Internet, and
an electronic processing unit adapted to process data packages received and to be transmitted by said electronic communication unit.

The electronic processing unit comprises a first storage sub-unit adapted to store files and a second storage sub-unit adapted to store configuration information; In addition, the electronic processing unit is programmed to operate as an edge server or as an intermediate server. In fact, typically, depending on the files and the devices requesting the files, the role of the server may change.

However, during the normal operation of such an innovative CDN, it will be typical for the same server to be able to operate both as an edge server (for certain files and/or user telematic device) and as an intermediary server (for certain files and/or user telematic devices). This dual functionality is typically simultaneous, i.e. if in a certain time interval (for example, ten or a hundred minutes) the server finds itself managing, for example, files of two different contents, in this time interval it can operate as an edge server for the operations related to the files of a first one of the two contents and as an intermediary server for the operations related to the files of a second one of the two contents.

In general, an edge server of such an innovative CDN may comprise:
an electronic communication unit adapted to be connected to a telematic network, and
an electronic processing unit adapted to process data packages received and to be transmitted by said electronic communication unit.

The electronic processing unit comprises a first storage sub-unit adapted to store files and a second storage sub-unit adapted to store configuration information related to a home POP of the edge server.

In addition, the electronic processing unit is programmed to deal with file requests, so that in response to a request for a locally possessed file it sends the file, and in response to a request for a non-locally possessed file it determines an address of a server neighbour in the same home POP or of a parent server in a different parent POP by performing a mathematical calculation on a name of this file taking into account configuration information, and causes a request for this file to be sent to the address of the neighbour server or parent server.

The second storage sub-unit can be adapted to store configuration information related to addresses of a origin server for one or more files. In this case, the electronic processing unit is programmed such that in response to a request for a non-locally possessed file it causes a request for this file to be sent to a origin server address.

In general, an intermediary server of such an innovative CDN may comprise:
an electronic communication unit adapted to be connected to a telematic network, in particular the Internet, and
an electronic processing unit adapted to process data packages received and to be transmitted by said electronic communication unit.

The electronic processing unit comprises a first storage sub-unit adapted to store files and a second storage sub-unit adapted to store configuration information related to a home POP of the intermediary server and one or more parent POP of the intermediary server.

In addition, the electronic processing unit is programmed to deal with file requests, so that in response to a request for a locally possessed file it sends the file, and in response to a request for a non-locally possessed file it determines a parent server address in a POP by performing a mathematical calculation on a name of this file taking into account configuration information, and causes a request for this file to be sent to the parent server address.

The second storage sub-unit can be adapted to store configuration information related to addresses of a origin server for one or more files. In this case, the electronic processing unit is programmed such that in response to a request for a non-locally possessed file it causes a request for this file to be sent to a origin or distributor server address.

In the case of distribution of a "stream", i.e. an indefinite sequence of "fragments" with no real beginning and no real end (or rather whose beginning and end are not known), the methods described above require only minor modifications.

Firstly, it must be borne in mind that when a request is made for a "stream", no server will be able to have a complete copy, but only a copy of one or more fragments. Indeed, for a "stream", one might think that there is a "current" fragment which could be the one just generated by the origin server, delivered to the CDN and distributed among its servers.

When a user telematic device, for example the device 300 in FIG. 2, requests a stream S from an edge server, for example the server 1510 in FIG. 2, the search for the "current" fragment of the stream S begins. With reference to FIG. 2, this may already be stored in the server 1510 or in the server 1520 or in the server 1610 or in the server 1710 or still only in the origin server 100.

Once the first fragment, i.e. this "current" fragment, has been sent to the device 300, the CDN will automatically send the subsequent fragments to the device 300. These fragments will always follow the same "data path" within the CDN; in the example above, the path is: 100, 1710, 1610, 1520, 1510.

Such a "data path" may already be constituted in whole or in part. For example, if another user telematic device interested in the same stream S and connected to the server 1510 had requested for it earlier (perhaps a few seconds or minutes earlier), the "data path" for the device 300 would already be entirely constituted. For example again, if another user telematic device interested in the same stream S and connected to the server 1520 had requested it earlier (perhaps a few seconds or minutes earlier), the "data path" for the device would already be almost entirely constituted. For example again, if another user telematic device interested in the same stream S and connected to the server 1610 had requested it earlier (perhaps a few seconds or minutes earlier), the "data path" for the device 300 would already be partially constituted. Obviously, if no user computer connected to the servers 1510, 1510, 1610, 1710, had previously requested the stream S, the "data path" for the PC 200 would be entirely to be constituted and therefore the first fragment of the stream S, i.e. the "current" fragment, there will be a sequence of requests that will reach the origin server 100 and a series of forwardings that will start from the origin server 100 and will reach the device 300.

The invention claimed is:

1. A method of distributing contents from a origin server to a plurality of edge servers through a plurality of intermediary servers,
wherein said edge servers and said intermediary servers constitute a Content Delivery Network and are connected between each other by a telematic network;
wherein configuration information is stored in said edge server at least related to a home Point Of Presence;
wherein the method comprises the following steps:
a) an edge server receives from a user telematic device a content request, then
b) the edge server verifies if the edge server possesses a copy of said content or a copy of at least a fragment of said content, then
c) if the verification at step b is positive, said edge server sends to said user telematic device said copy of said content or said copy of at least a fragment of said content, and
if the verification at step b is negative, said edge server determines an address of a neighbour server, wherein said address of said neighbour server is obtained by performing a mathematical calculation on a name of said content taking into account said configuration information of the edge server, wherein said edge server and said neighbour server belong to a same home Point Of Presence,
then if the verification at step b is negative,
d) said edge server sends to said address of neighbour server a first request related to said content;
wherein said neighbour server is an intermediary server.

2. The method according to claim 1, wherein configuration information is stored in said neighbour server at least related to a parent Point Of Presence for said content, wherein the method further comprises the following steps:
e) said neighbour server receives from said edge server said first request related to said content, then
f) said neighbour server verifies if said neighbour server possesses a copy of said content or a copy of at least a fragment of said content, then
g) if the verification at step f is positive, said neighbour server sends said copy of said content or said copy of at least a fragment of said content to said edge server, and
if the verification at step f is negative, said neighbour server determines an address of a parent server, wherein said address of said parent server is obtained by performing a mathematical calculation on a name of said content taking into account said configuration information of the neighbour server, wherein said neighbour server belongs to said home Point Of Presence and said parent server belongs to said parent Point Of Presence other than said home Point Of Presence,
then if the verification at step f is negative,
h) said neighbour server sends to said address of parent server a second request related to said content;
wherein said parent server is an intermediary server.

3. The method according to claim 1, wherein based on configuration information stored in said edge server and on a mathematical calculation, said edge server can send a request related to said content directly to a parent server of a parent Point Of Presence other than said home Point Of Presence, said parent server being an intermediary server.

4. The method according to claim 1, wherein based on configuration information stored in said edge server, said edge server can send a request related to said content directly to a origin server.

5. The method according to claim 2, wherein configuration information is stored in said parent server at least related to a grandparent Point Of Presence for said content, wherein the method further comprises the following steps:
i) said parent server receives from said neighbour server said second request related to said content, then
l) said parent server verifies if the parent server possesses a copy of said content or a copy of at least a fragment of said content, then
m) if the verification at step l is positive, said parent server sends to said neighbour server said copy of said content or said copy of at least a fragment of said content, and
if the verification at step l is negative, said parent server determines an address of a grandparent server, wherein said address of said grandparent server is obtained by performing a mathematical calculation on a name of said content taking into account said configuration information of the parent server, wherein said parent server belongs to said parent Point Of Presence and said grandparent server belongs to said grandparent Point Of Presence other than said parent Point Of Presence,
then if the verification at step l is negative,
n) said parent server sends to said address of grandparent server a third request related to said content;
wherein said grandparent server is an intermediary server.

6. The method according to claim 5, wherein configuration information is stored in said grandparent server at least related to an address of said origin server for said content, wherein the method further comprises the following steps:
o) said grandparent server receives from said parent server said third request related to said content, then
p) said grandparent server verifies if it possesses a copy of said content or a copy of at least a fragment of said content, then
q) if the verification at step p is positive, said grandparent server sends to said parent server said copy of said content or a copy of at least a fragment of said content, and
if the verification at step p is negative, said grandparent server sends to said address of origin server a fourth request related to said content.

7. The method according to claim 5, wherein a server can forward a request related to said content to an intermediary server belonging to a different Point Of Presence.

8. The method according to claim 1, wherein configuration information is stored in said intermediary servers at least related to addresses of a origin server for one or more contents, wherein for each request related to a content an intermediary server verifies if the intermediary server is a master server related to said content, and if said verification is positive and if said intermediary server does not possess a copy of said content or a copy of at least a fragment of said content, said intermediary server sends to the origin server a fifth request related to said content.

9. The method according to claim 1, wherein said mathematical calculation determines an integer number which represents an offset with respect to a reference address associated with a Point Of Presence.

10. The method according to claim 9, wherein said mathematical calculation determines an integer number that is comprised between 0 and the number of servers belonging to said Point Of Presence decremented by 1 or is comprised between 1 and the number of servers belonging to said Point Of Presence.

11. A telematic system comprising a plurality of edge servers and a plurality of intermediate servers of a Content Delivery Network adapted to be connected between them by a telematic network, configured and programmed to implement the method according to claim 1.

12. An edge server of a Content Delivery Network, comprising:
  an electronic communication unit adapted to be connected to a telematic network, and
  an electronic processing unit adapted to process data packages received and to be transmitted by said electronic communication unit;
  wherein said electronic processing unit comprises a first storage sub-unit adapted to store contents and/or fragments of contents and a second storage sub-unit adapted to store configuration information related to a home Point Of Presence of the edge server; and
  wherein said electronic processing unit is programmed to deal with content requests, so that in response to a request for a locally possessed content the electronic processing unit sends the content and in response to a non-locally possessed content the electronic processing unit determines address of a server neighbour in the same home Point Of Presence by performing a mathematical calculation on a name of said content taking into account said configuration information, and causes a request related to said content to be sent to said address of neighbour server.

13. The edge server according to claim 12,
  wherein said second storage sub-unit is adapted to store configuration information related to addresses of a origin server for one or more contents; and
  wherein said electronic processing unit is programmed such that in response to a request for a non-locally possessed content the electronic processing unit causes a request related to said content to be sent to an address of origin server.

14. An Intermediary server of a Content Delivery Network, including:
  an electronic communication unit adapted to be connected to a telematic network, and
  an electronic processing unit adapted to process data packages received and to be transmitted by said electronic communication unit;
  wherein said electronic processing unit comprises a first storage sub-unit adapted to store contents and/or fragments of contents and a second storage sub-unit adapted to store configuration information related to a home Point Of Presence of the intermediary server and one or more parent Point Of Presence of the intermediary server; and
  wherein said electronic processing unit is programmed to deal with content requests, so that in response to a request for a locally possessed content the electronic processing unit sends the content and in response to a non-locally possessed content the electronic processing unit determines an address of a parent server in a parent Point Of Presence by performing a mathematical calculation on a name of said content taking into account said configuration information, and causes a request related to said content to be sent to said address of parent server.

15. The Intermediary server according to claim 14,
  wherein said second storage sub-unit is adapted to store configuration information related to addresses of a origin server for one or more contents; and
  wherein said electronic processing unit is programmed such that in response to a request for a non-locally possessed content the electronic processing unit causes a request related to said content to be sent to a origin server address.

* * * * *